United States Patent
Chaji

(10) Patent No.: US 9,952,698 B2
(45) Date of Patent: Apr. 24, 2018

(54) DYNAMIC ADJUSTMENT OF TOUCH RESOLUTIONS ON AN AMOLED DISPLAY

(71) Applicant: Ignis Innovation Inc., Waterloo (CA)

(72) Inventor: Gholamreza Chaji, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

(21) Appl. No.: 14/776,887

(22) PCT Filed: Mar. 3, 2014

(86) PCT No.: PCT/IB2014/059409
§ 371 (c)(1),
(2) Date: Sep. 15, 2015

(87) PCT Pub. No.: WO2014/140992
PCT Pub. Date: Sep. 18, 2014

(65) Prior Publication Data
US 2016/0041668 A1    Feb. 11, 2016

Related U.S. Application Data

(60) Provisional application No. 61/792,358, filed on Mar. 15, 2013.

(51) Int. Cl.
*G06F 3/045* (2006.01)
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ...... G06F 3/044; G06F 3/0421; G06F 3/0416; G06F 3/04883
See application file for complete search history.

(56) References Cited

U.S. PATENT DOCUMENTS

| 4,354,162 A | 10/1982 | Wright |
| 4,758,831 A | 7/1988 | Kasahara et al. |

(Continued)

FOREIGN PATENT DOCUMENTS

| CA | 1294034 | 1/1992 |
| CA | 2109951 | 11/1992 |

(Continued)

OTHER PUBLICATIONS

Ahnood et al.: "Effect of threshold voltage instability on field effect mobility in thin film transistors deduced from constant current measurements"; dated Aug. 2009 (3 pages).

(Continued)

*Primary Examiner* — Nan-Ying Yang
(74) *Attorney, Agent, or Firm* — Nixon Peabody LLP

(57) ABSTRACT

Dynamically adjusting a touch resolution of a display having pixel circuits each including an OLED driven by a driving transistor according to programming information representing a desired brightness for each OLED. A first touch resolution of the display is defined to create first touch zones relative to the display as images are being displayed thereon. A first touch in one of the first touch zones is detected by measuring a voltage across an anode and a cathode of each of a first set of OLEDs in the first touch zone. The first touch resolution is dynamically changed to a different second touch resolution to create second touch zones as further images are being displayed. A second touch in one of the second touch zones is detected by measuring a voltage across an anode and a cathode of each of a second set of OLEDs in the second touch zone.

9 Claims, 3 Drawing Sheets

(56) References Cited

U.S. PATENT DOCUMENTS

| | | |
|---|---|---|
| 4,963,860 A | 10/1990 | Stewart |
| 4,975,691 A | 12/1990 | Lee |
| 4,996,523 A | 2/1991 | Bell et al. |
| 5,051,739 A | 9/1991 | Hayashida et al. |
| 5,222,082 A | 6/1993 | Plus |
| 5,266,515 A | 11/1993 | Robb et al. |
| 5,498,880 A | 3/1996 | Lee et al. |
| 5,589,847 A | 12/1996 | Lewis |
| 5,619,033 A | 4/1997 | Weisfield |
| 5,648,276 A | 7/1997 | Hara et al. |
| 5,670,973 A | 9/1997 | Bassetti et al. |
| 5,684,365 A | 11/1997 | Tang et al. |
| 5,686,935 A | 11/1997 | Weisbrod |
| 5,712,653 A | 1/1998 | Katoh et al. |
| 5,714,968 A | 2/1998 | Ikeda |
| 5,747,928 A | 5/1998 | Shanks et al. |
| 5,748,160 A | 5/1998 | Shieh et al. |
| 5,784,042 A | 7/1998 | Ono et al. |
| 5,790,234 A | 8/1998 | Matsuyama |
| 5,815,303 A | 9/1998 | Berlin |
| 5,870,071 A | 2/1999 | Kawahata |
| 5,874,803 A | 2/1999 | Garbuzov et al. |
| 5,880,582 A | 3/1999 | Sawada |
| 5,903,248 A | 5/1999 | Irwin |
| 5,917,280 A | 6/1999 | Burrows et al. |
| 5,923,794 A | 7/1999 | McGrath et al. |
| 5,952,789 A | 9/1999 | Stewart et al. |
| 5,990,629 A | 11/1999 | Yamada et al. |
| 6,023,259 A | 2/2000 | Howard et al. |
| 6,069,365 A | 5/2000 | Chow et al. |
| 6,081,131 A | 6/2000 | Ishii |
| 6,091,203 A | 7/2000 | Kawashima et al. |
| 6,097,360 A | 8/2000 | Holloman |
| 6,144,222 A | 11/2000 | Ho |
| 6,157,583 A | 12/2000 | Starnes et al. |
| 6,166,489 A | 12/2000 | Thompson et al. |
| 6,177,915 B1 | 1/2001 | Beeteson et al. |
| 6,225,846 B1 | 5/2001 | Wada et al. |
| 6,229,508 B1 | 5/2001 | Kane |
| 6,232,939 B1 | 5/2001 | Saito et al. |
| 6,246,180 B1 | 6/2001 | Nishigaki |
| 6,252,248 B1 | 6/2001 | Sano et al. |
| 6,259,424 B1 | 7/2001 | Kurogane |
| 6,274,887 B1 | 8/2001 | Yamazaki et al. |
| 6,288,696 B1 | 9/2001 | Holloman |
| 6,300,928 B1 | 10/2001 | Kim |
| 6,303,963 B1 | 10/2001 | Ohtani et al. |
| 6,306,694 B1 | 10/2001 | Yamazaki et al. |
| 6,307,322 B1 | 10/2001 | Dawson et al. |
| 6,316,786 B1 | 11/2001 | Mueller et al. |
| 6,320,325 B1 | 11/2001 | Cok et al. |
| 6,323,631 B1 | 11/2001 | Juang |
| 6,323,832 B1 | 11/2001 | Nishizawa et al. |
| 6,345,085 B1 | 2/2002 | Yeo et al. |
| 6,348,835 B1 | 2/2002 | Sato et al. |
| 6,365,917 B1 | 4/2002 | Yamazaki |
| 6,373,453 B1 | 4/2002 | Yudasaka |
| 6,384,427 B1 | 5/2002 | Yamazaki et al. |
| 6,392,617 B1 | 5/2002 | Gleason |
| 6,399,988 B1 | 6/2002 | Yamazaki |
| 6,414,661 B1 | 7/2002 | Shen et al. |
| 6,420,758 B1 | 7/2002 | Nakajima |
| 6,420,834 B2 | 7/2002 | Yamazaki et al. |
| 6,420,988 B1 | 7/2002 | Azami et al. |
| 6,433,488 B1 | 8/2002 | Bu |
| 6,445,376 B2 | 9/2002 | Parrish |
| 6,468,638 B2 | 10/2002 | Jacobsen et al. |
| 6,489,952 B1 | 12/2002 | Tanaka et al. |
| 6,501,098 B2 | 12/2002 | Yamazaki |
| 6,501,466 B1 | 12/2002 | Yamagashi et al. |
| 6,512,271 B1 | 1/2003 | Yamazaki et al. |
| 6,518,594 B1 | 2/2003 | Nakajima et al. |
| 6,524,895 B2 | 2/2003 | Yamazaki et al. |
| 6,531,713 B1 | 3/2003 | Yamazaki |
| 6,559,594 B2 | 5/2003 | Fukunaga et al. |
| 6,573,195 B1 | 6/2003 | Yamazaki et al. |
| 6,573,584 B1 | 6/2003 | Nagakari et al. |
| 6,576,926 B1 | 6/2003 | Yamazaki et al. |
| 6,580,408 B1 | 6/2003 | Bae et al. |
| 6,580,657 B2 | 6/2003 | Sanford et al. |
| 6,583,775 B1 | 6/2003 | Sekiya et al. |
| 6,583,776 B2 | 6/2003 | Yamazaki et al. |
| 6,587,086 B1 | 7/2003 | Koyama |
| 6,593,691 B2 | 7/2003 | Nishi et al. |
| 6,594,606 B2 | 7/2003 | Everitt |
| 6,597,203 B2 | 7/2003 | Forbes |
| 6,611,108 B2 | 8/2003 | Kimura |
| 6,617,644 B1 | 9/2003 | Yamazaki et al. |
| 6,618,030 B2 | 9/2003 | Kane et al. |
| 6,641,933 B1 | 11/2003 | Yamazaki et al. |
| 6,661,180 B2 | 12/2003 | Koyama |
| 6,661,397 B2 | 12/2003 | Mikami et al. |
| 6,670,637 B2 | 12/2003 | Yamazaki et al. |
| 6,677,713 B1 | 1/2004 | Sung |
| 6,680,577 B1 | 1/2004 | Inukai et al. |
| 6,687,266 B1 | 2/2004 | Ma et al. |
| 6,690,344 B1 | 2/2004 | Takeuchi et al. |
| 6,693,388 B2 | 2/2004 | Oomura |
| 6,693,610 B2 | 2/2004 | Shannon et al. |
| 6,697,057 B2 | 2/2004 | Koyama et al. |
| 6,720,942 B2 | 4/2004 | Lee et al. |
| 6,734,636 B2 | 5/2004 | Sanford et al. |
| 6,738,034 B2 | 5/2004 | Kaneko et al. |
| 6,738,035 B1 | 5/2004 | Fan |
| 6,771,028 B1 | 8/2004 | Winters |
| 6,777,712 B2 | 8/2004 | Sanford et al. |
| 6,780,687 B2 | 8/2004 | Nakajima et al. |
| 6,806,638 B2 | 10/2004 | Lih et al. |
| 6,806,857 B2 | 10/2004 | Sempel et al. |
| 6,809,706 B2 | 10/2004 | Shimoda |
| 6,859,193 B1 | 2/2005 | Yumoto |
| 6,861,670 B1 | 3/2005 | Ohtani et al. |
| 6,873,117 B2 | 3/2005 | Ishizuka |
| 6,873,320 B2 | 3/2005 | Nakamura |
| 6,878,968 B1 | 4/2005 | Ohnuma |
| 6,909,114 B1 | 6/2005 | Yamazaki |
| 6,909,419 B2 | 6/2005 | Zavracky et al. |
| 6,919,871 B2 | 7/2005 | Kwon |
| 6,937,215 B2 | 8/2005 | Lo |
| 6,940,214 B1 | 9/2005 | Komiya et al. |
| 6,943,500 B2 | 9/2005 | LeChevalier |
| 6,954,194 B2 | 10/2005 | Matsumoto et al. |
| 6,956,547 B2 | 10/2005 | Bae et al. |
| 6,995,510 B2 | 2/2006 | Murakami et al. |
| 6,995,519 B2 | 2/2006 | Arnold et al. |
| 7,022,556 B1 | 4/2006 | Adachi |
| 7,023,408 B2 | 4/2006 | Chen et al. |
| 7,027,015 B2 | 4/2006 | Booth, Jr. et al. |
| 7,034,793 B2 | 4/2006 | Sekiya et al. |
| 7,088,051 B1 | 8/2006 | Cok |
| 7,106,285 B2 | 9/2006 | Naugler |
| 7,116,058 B2 | 10/2006 | Lo et al. |
| 7,129,914 B2 | 10/2006 | Knapp et al. |
| 7,129,917 B2 | 10/2006 | Yamazaki et al. |
| 7,141,821 B1 | 11/2006 | Yamazaki et al. |
| 7,161,566 B2 | 1/2007 | Cok et al. |
| 7,193,589 B2 | 3/2007 | Yoshida et al. |
| 7,199,516 B2 | 4/2007 | Seo et al. |
| 7,220,997 B2 | 5/2007 | Nakata |
| 7,235,810 B1 | 6/2007 | Yamazaki et al. |
| 7,245,277 B2 | 7/2007 | Ishizuka |
| 7,248,236 B2 | 7/2007 | Nathan et al. |
| 7,264,979 B2 | 9/2007 | Yamagata et al. |
| 7,274,345 B2 | 9/2007 | Imamura et al. |
| 7,274,363 B2 | 9/2007 | Ishizuka et al. |
| 7,279,711 B1 | 10/2007 | Yamazaki et al. |
| 7,304,621 B2 | 12/2007 | Oomori et al. |
| 7,310,092 B2 | 12/2007 | Imamura |
| 7,315,295 B2 | 1/2008 | Kimura |
| 7,317,429 B2 | 1/2008 | Shirasaki et al. |
| 7,319,465 B2 | 1/2008 | Mikami et al. |
| 7,321,348 B2 | 1/2008 | Cok et al. |
| 7,339,636 B2 | 3/2008 | Voloschenko et al. |
| 7,355,574 B1 | 4/2008 | Leon et al. |

(56) References Cited

U.S. PATENT DOCUMENTS

| | | |
|---|---|---|
| 7,358,941 B2 | 4/2008 | Ono et al. |
| 7,402,467 B1 | 7/2008 | Kadono et al. |
| 7,414,600 B2 | 8/2008 | Nathan et al. |
| 7,432,885 B2 | 10/2008 | Asano et al. |
| 7,474,285 B2 | 1/2009 | Kimura |
| 7,485,478 B2 | 2/2009 | Yamagata et al. |
| 7,502,000 B2 | 3/2009 | Yuki et al. |
| 7,535,449 B2 | 5/2009 | Miyazawa |
| 7,554,512 B2 | 6/2009 | Steer |
| 7,569,849 B2 | 8/2009 | Nathan et al. |
| 7,619,594 B2 | 11/2009 | Hu |
| 7,619,597 B2 | 11/2009 | Nathan et al. |
| 7,697,052 B1 | 4/2010 | Yamazaki et al. |
| 7,825,419 B2 | 11/2010 | Yamagata et al. |
| 7,859,492 B2 | 12/2010 | Kohno |
| 7,868,859 B2 | 1/2011 | Tomida et al. |
| 7,876,294 B2 | 1/2011 | Sasaki et al. |
| 7,948,170 B2 | 5/2011 | Striakhilev et al. |
| 7,969,390 B2 | 6/2011 | Yoshida |
| 7,995,010 B2 | 8/2011 | Yamazaki et al. |
| 8,044,893 B2 | 10/2011 | Nathan et al. |
| 8,115,707 B2 | 2/2012 | Nathan et al. |
| 8,378,362 B2 | 2/2013 | Heo et al. |
| 8,493,295 B2 | 7/2013 | Yamazaki et al. |
| 8,497,525 B2 | 7/2013 | Yamagata et al. |
| 2001/0002703 A1 | 6/2001 | Koyama |
| 2001/0004190 A1 | 6/2001 | Nishi et al. |
| 2001/0013806 A1 | 8/2001 | Notani |
| 2001/0015653 A1 | 8/2001 | De Jong et al. |
| 2001/0020926 A1 | 9/2001 | Kujik |
| 2001/0026127 A1 | 10/2001 | Yoneda et al. |
| 2001/0026179 A1 | 10/2001 | Saeki |
| 2001/0026257 A1 | 10/2001 | Kimura |
| 2001/0030323 A1 | 10/2001 | Ikeda |
| 2001/0033199 A1 | 10/2001 | Aoki |
| 2001/0038098 A1 | 11/2001 | Yamazaki et al. |
| 2001/0043173 A1 | 11/2001 | Troutman |
| 2001/0045929 A1 | 11/2001 | Prache et al. |
| 2001/0052606 A1 | 12/2001 | Sempel et al. |
| 2001/0052898 A1 | 12/2001 | Osame et al. |
| 2002/0000576 A1 | 1/2002 | Inukai |
| 2002/0011796 A1 | 1/2002 | Koyama |
| 2002/0011799 A1 | 1/2002 | Kimura |
| 2002/0011981 A1 | 1/2002 | Kujik |
| 2002/0015031 A1 | 2/2002 | Fujita et al. |
| 2002/0015032 A1 | 2/2002 | Koyama et al. |
| 2002/0030528 A1 | 3/2002 | Matsumoto et al. |
| 2002/0030647 A1 | 3/2002 | Hack et al. |
| 2002/0036463 A1 | 3/2002 | Yoneda et al. |
| 2002/0047852 A1 | 4/2002 | Inukai et al. |
| 2002/0048829 A1 | 4/2002 | Yamazaki et al. |
| 2002/0050795 A1 | 5/2002 | Imura |
| 2002/0053401 A1 | 5/2002 | Ishikawa et al. |
| 2002/0070909 A1 | 6/2002 | Asano et al. |
| 2002/0080108 A1 | 6/2002 | Wang |
| 2002/0084463 A1 | 7/2002 | Sanford et al. |
| 2002/0101172 A1 | 8/2002 | Bu |
| 2002/0101433 A1 | 8/2002 | McKnight |
| 2002/0113248 A1 | 8/2002 | Yamagata et al. |
| 2002/0122308 A1 | 9/2002 | Ikeda |
| 2002/0130686 A1 | 9/2002 | Forbes |
| 2002/0154084 A1 | 10/2002 | Tanaka et al. |
| 2002/0158823 A1 | 10/2002 | Zavracky et al. |
| 2002/0163314 A1 | 11/2002 | Yamazaki et al. |
| 2002/0167471 A1 | 11/2002 | Everitt |
| 2002/0180369 A1 | 12/2002 | Koyama |
| 2002/0180721 A1 | 12/2002 | Kimura et al. |
| 2002/0186214 A1 | 12/2002 | Siwinski |
| 2002/0190332 A1 | 12/2002 | Lee et al. |
| 2002/0190924 A1 | 12/2002 | Asano et al. |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0020413 A1 | 1/2003 | Oomura |
| 2003/0030603 A1 | 2/2003 | Shimoda |
| 2003/0062524 A1 | 4/2003 | Kimura |
| 2003/0063081 A1 | 4/2003 | Kimura et al. |
| 2003/0071804 A1 | 4/2003 | Yamazaki et al. |
| 2003/0076048 A1 | 4/2003 | Rutherford |
| 2003/0090445 A1 | 5/2003 | Chen et al. |
| 2003/0090447 A1 | 5/2003 | Kimura |
| 2003/0090481 A1 | 5/2003 | Kimura |
| 2003/0095087 A1 | 5/2003 | Libsch |
| 2003/0107560 A1 | 6/2003 | Yumoto et al. |
| 2003/0111966 A1 | 6/2003 | Mikami et al. |
| 2003/0122745 A1 | 7/2003 | Miyazawa |
| 2003/0140958 A1 | 7/2003 | Yang et al. |
| 2003/0151569 A1 | 8/2003 | Lee et al. |
| 2003/0169219 A1 | 9/2003 | LeChevalier |
| 2003/0174152 A1 | 9/2003 | Noguchi |
| 2003/0179626 A1 | 9/2003 | Sanford et al. |
| 2003/0197663 A1 | 10/2003 | Lee et al. |
| 2003/0206060 A1 | 11/2003 | Suzuki |
| 2003/0230980 A1 | 12/2003 | Forrest et al. |
| 2004/0027063 A1 | 2/2004 | Nishikawa |
| 2004/0056604 A1 | 3/2004 | Shih et al. |
| 2004/0066357 A1 | 4/2004 | Kawasaki |
| 2004/0070557 A1 | 4/2004 | Asano et al. |
| 2004/0080262 A1 | 4/2004 | Park et al. |
| 2004/0080470 A1 | 4/2004 | Yamazaki et al. |
| 2004/0090400 A1 | 5/2004 | Yoo |
| 2004/0108518 A1 | 6/2004 | Jo |
| 2004/0113903 A1 | 6/2004 | Mikami et al. |
| 2004/0129933 A1 | 7/2004 | Nathan et al. |
| 2004/0130516 A1 | 7/2004 | Nathan et al. |
| 2004/0135749 A1 | 7/2004 | Kondakov et al. |
| 2004/0145547 A1 | 7/2004 | Oh |
| 2004/0150592 A1 | 8/2004 | Mizukoshi et al. |
| 2004/0150594 A1 | 8/2004 | Koyama et al. |
| 2004/0150595 A1 | 8/2004 | Kasai |
| 2004/0155841 A1 | 8/2004 | Kasai |
| 2004/0174347 A1 | 9/2004 | Sun et al. |
| 2004/0174349 A1 | 9/2004 | Libsch |
| 2004/0183759 A1 | 9/2004 | Stevenson et al. |
| 2004/0189627 A1 | 9/2004 | Shirasaki et al. |
| 2004/0196275 A1 | 10/2004 | Hattori |
| 2004/0201554 A1 | 10/2004 | Satoh |
| 2004/0207615 A1 | 10/2004 | Yumoto |
| 2004/0233125 A1 | 11/2004 | Tanghe et al. |
| 2004/0239596 A1 | 12/2004 | Ono et al. |
| 2004/0252089 A1 | 12/2004 | Ono et al. |
| 2004/0257355 A1 | 12/2004 | Naugler |
| 2004/0263437 A1 | 12/2004 | Hattori |
| 2005/0007357 A1 | 1/2005 | Yamashita et al. |
| 2005/0030267 A1 | 2/2005 | Tanghe et al. |
| 2005/0035709 A1 | 2/2005 | Furuie et al. |
| 2005/0067970 A1 | 3/2005 | Libsch et al. |
| 2005/0067971 A1 | 3/2005 | Kane |
| 2005/0068270 A1 | 3/2005 | Awakura |
| 2005/0088085 A1 | 4/2005 | Nishikawa et al. |
| 2005/0088103 A1 | 4/2005 | Kageyama et al. |
| 2005/0110420 A1 | 5/2005 | Arnold et al. |
| 2005/0117096 A1 | 6/2005 | Voloschenko et al. |
| 2005/0140598 A1 | 6/2005 | Kim et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0206590 A1 | 9/2005 | Sasaki et al. |
| 2005/0225686 A1 | 10/2005 | Brummack et al. |
| 2005/0260777 A1 | 11/2005 | Brabec et al. |
| 2005/0269959 A1 | 12/2005 | Uchino et al. |
| 2005/0269960 A1 | 12/2005 | Ono et al. |
| 2005/0285822 A1 | 12/2005 | Reddy et al. |
| 2005/0285825 A1 | 12/2005 | Eom et al. |
| 2006/0007072 A1 | 1/2006 | Choi et al. |
| 2006/0012310 A1 | 1/2006 | Chen et al. |
| 2006/0027807 A1 | 2/2006 | Nathan et al. |
| 2006/0030084 A1 | 2/2006 | Young |
| 2006/0038758 A1 | 2/2006 | Routley et al. |
| 2006/0044227 A1 | 3/2006 | Hadcock |
| 2006/0066527 A1 | 3/2006 | Chou |
| 2006/0092185 A1 | 5/2006 | Jo et al. |
| 2006/0232522 A1 | 10/2006 | Roy et al. |

(56) References Cited

U.S. PATENT DOCUMENTS

| | | |
|---|---|---|
| 2006/0261841 A1 | 11/2006 | Fish |
| 2006/0264143 A1 | 11/2006 | Lee et al. |
| 2006/0273997 A1 | 12/2006 | Nathan et al. |
| 2006/0284801 A1 | 12/2006 | Yoon et al. |
| 2007/0001937 A1 | 1/2007 | Park et al. |
| 2007/0001939 A1 | 1/2007 | Hashimoto et al. |
| 2007/0008268 A1 | 1/2007 | Park et al. |
| 2007/0008297 A1 | 1/2007 | Bassetti |
| 2007/0046195 A1 | 3/2007 | Chin et al. |
| 2007/0069998 A1 | 3/2007 | Naugler et al. |
| 2007/0080905 A1 | 4/2007 | Takahara |
| 2007/0080906 A1 | 4/2007 | Tanabe |
| 2007/0080908 A1 | 4/2007 | Nathan et al. |
| 2007/0080918 A1 | 4/2007 | Kawachi et al. |
| 2007/0103419 A1 | 5/2007 | Uchino et al. |
| 2007/0182671 A1 | 8/2007 | Nathan et al. |
| 2007/0273294 A1 | 11/2007 | Nagayama |
| 2007/0285359 A1 | 12/2007 | Ono |
| 2007/0296672 A1 | 12/2007 | Kim et al. |
| 2008/0012835 A1 | 1/2008 | Rimon et al. |
| 2008/0042948 A1 | 2/2008 | Yamashita et al. |
| 2008/0055209 A1 | 3/2008 | Cok |
| 2008/0074413 A1 | 3/2008 | Ogura |
| 2008/0088549 A1 | 4/2008 | Nathan et al. |
| 2008/0122803 A1 | 5/2008 | Izadi et al. |
| 2008/0230118 A1 | 9/2008 | Nakatani et al. |
| 2009/0002336 A1* | 1/2009 | Choi ............... G06F 3/044 345/174 |
| 2009/0032807 A1 | 2/2009 | Shinohara et al. |
| 2009/0051283 A1 | 2/2009 | Cok et al. |
| 2009/0160743 A1 | 6/2009 | Tomida et al. |
| 2009/0162961 A1 | 6/2009 | Deane |
| 2009/0174628 A1 | 7/2009 | Wang et al. |
| 2009/0213046 A1 | 8/2009 | Nam |
| 2010/0052524 A1 | 3/2010 | Kinoshita |
| 2010/0078230 A1 | 4/2010 | Rosenblatt et al. |
| 2010/0079711 A1 | 4/2010 | Tanaka |
| 2010/0097335 A1 | 4/2010 | Jung et al. |
| 2010/0133994 A1 | 6/2010 | Song et al. |
| 2010/0134456 A1 | 6/2010 | Oyamada |
| 2010/0156279 A1 | 6/2010 | Tamura et al. |
| 2010/0237374 A1 | 9/2010 | Chu et al. |
| 2010/0328294 A1 | 12/2010 | Sasaki et al. |
| 2011/0001708 A1* | 1/2011 | Sleeman ............ G06F 3/0416 345/173 |
| 2011/0090210 A1 | 4/2011 | Sasaki et al. |
| 2011/0133636 A1 | 6/2011 | Matsuo et al. |
| 2011/0148801 A1 | 6/2011 | Bateman et al. |
| 2011/0180825 A1 | 7/2011 | Lee et al. |
| 2012/0212468 A1 | 8/2012 | Govil |
| 2013/0009930 A1 | 1/2013 | Cho et al. |
| 2013/0032831 A1 | 2/2013 | Chaji et al. |
| 2013/0113785 A1 | 5/2013 | Sumi |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 436 451 | 8/2002 |
| CA | 2 438 577 | 8/2002 |
| CA | 2 483 645 | 12/2003 |
| CA | 2 463 653 | 1/2004 |
| CA | 2498136 | 3/2004 |
| CA | 2522396 | 11/2004 |
| CA | 2443206 | 3/2005 |
| CA | 2472671 | 12/2005 |
| CA | 2567076 | 1/2006 |
| CA | 2526782 | 4/2006 |
| CN | 1381032 | 11/2002 |
| CN | 1448908 | 10/2003 |
| CN | 101256293 A | 9/2008 |
| CN | 101727237 A | 6/2010 |
| CN | 102799331 A | 11/2012 |
| CN | 102955600 A | 3/2013 |
| DE | 20 2006 005427 | 6/2006 |
| EP | 0 940 796 | 9/1999 |
| EP | 1 028 471 A | 8/2000 |
| EP | 1 103 947 | 5/2001 |
| EP | 1 130 565 A1 | 9/2001 |
| EP | 1 184 833 | 3/2002 |
| EP | 1 194 013 | 4/2002 |
| EP | 1 310 939 | 5/2003 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 439 520 | 7/2004 |
| EP | 1 465 143 A | 10/2004 |
| EP | 1 467 408 | 10/2004 |
| EP | 1 517 290 | 3/2005 |
| EP | 1 521 203 A2 | 4/2005 |
| EP | 2317499 | 5/2011 |
| GB | 2 205 431 | 12/1988 |
| JP | 09 090405 | 4/1997 |
| JP | 10-153759 | 6/1998 |
| JP | 10-254410 | 9/1998 |
| JP | 11 231805 | 8/1999 |
| JP | 11-282419 | 10/1999 |
| JP | 2000/056847 | 2/2000 |
| JP | 2000-077192 | 3/2000 |
| JP | 2000-089198 | 3/2000 |
| JP | 2000-352941 | 12/2000 |
| JP | 2002-91376 | 3/2002 |
| JP | 2002-268576 | 9/2002 |
| JP | 2002-278513 | 9/2002 |
| JP | 2002-333862 | 11/2002 |
| JP | 2003-022035 | 1/2003 |
| JP | 2003-076331 | 3/2003 |
| JP | 2003-150082 | 5/2003 |
| JP | 2003-177709 | 6/2003 |
| JP | 2003-271095 | 9/2003 |
| JP | 2003-308046 | 10/2003 |
| JP | 2005-057217 | 3/2005 |
| JP | 2006065148 | 3/2006 |
| JP | 2009282158 | 12/2009 |
| TW | 485337 | 5/2002 |
| TW | 502233 | 9/2002 |
| TW | 538650 | 6/2003 |
| TW | 569173 | 1/2004 |
| WO | WO 94/25954 | 11/1994 |
| WO | WO 99/48079 | 9/1999 |
| WO | WO 01/27910 A1 | 4/2001 |
| WO | WO 02/067327 A | 8/2002 |
| WO | WO 03/034389 A | 4/2003 |
| WO | WO 03/063124 | 7/2003 |
| WO | WO 03/077231 | 9/2003 |
| WO | WO 03/105117 | 12/2003 |
| WO | WO 2004/003877 | 1/2004 |
| WO | WO 2004/034364 | 4/2004 |
| WO | WO 2005/022498 | 3/2005 |
| WO | WO 2005/029455 | 3/2005 |
| WO | WO 2005/055185 | 6/2005 |
| WO | WO 2006/053424 | 5/2006 |
| WO | WO 2006/063448 A | 6/2006 |
| WO | WO 2006/137337 | 12/2006 |
| WO | WO 2007/003877 A | 1/2007 |
| WO | WO 2007/079572 | 7/2007 |
| WO | WO 2010/023270 | 3/2010 |

OTHER PUBLICATIONS

Alexander et al.: "Pixel circuits and drive schemes for glass and elastic AMOLED displays"; dated Jul. 2005 (9 pages).

Alexander et al.: "Unique Electrical Measurement Technology for Compensation, Inspection, and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

(56) References Cited

OTHER PUBLICATIONS

Chaji et al.: "A Current-Mode Comparator for Digital Calibration of Amorphous Silicon AMOLED Displays"; dated Jul. 2008 (5 pages).
Chaji et al.: "A fast settling current driver based on the CCII for AMOLED displays"; dated Dec. 2009 (6 pages).
Chaji et al.: "A Low-Cost Stable Amorphous Silicon AMOLED Display with Full V~T—and V~O~L~E~D Shift Compensation"; dated May 2007 (4 pages).
Chaji et al.: "A low-power driving scheme for a-Si:H active-matrix organic light-emitting diode displays"; dated Jun. 2005 (4 pages).
Chaji et al.: "A low-power high-performance digital circuit for deep submicron technologies"; dated Jun. 2005 (4 pages).
Chaji et al.: "A novel a-Si:H AMOLED pixel circuit based on short-term stress stability of a-Si:H TFTs"; dated Oct. 2005 (3 pages).
Chaji et al.: "A Novel Driving Scheme and Pixel Circuit for AMOLED Displays"; dated Jun. 2006 (4 pages).
Chaji et al.: "A novel driving scheme for high-resolution large-area a-Si:H AMOLED displays"; dated Aug. 2005 (4 pages).
Chaji et al.: "A Stable Voltage-Programmed Pixel Circuit for a-Si:H AMOLED Displays"; dated Dec. 2006 (12 pages).
Chaji et al.: "A Sub-µA fast-settling current-programmed pixel circuit for AMOLED displays"; dated Sep. 2007.
Chaji et al.: "An Enhanced and Simplified Optical Feedback Pixel Circuit for AMOLED Displays"; dated Oct. 2006.
Chaji et al.: "Compensation technique for DC and transient instability of thin film transistor circuits for large-area devices"; dated Aug. 2008.
Chaji et al.: "Driving scheme for stable operation of 2-TFT a-Si AMOLED pixel"; dated Apr. 2005 (2 pages).
Chaji et al.: "Dynamic-effect compensating technique for stable a-Si:H AMOLED displays"; dated Aug. 2005 (4 pages).
Chaji et al.: "Electrical Compensation of OLED Luminance Degradation"; dated Dec. 2007 (3 pages).
Chaji et al.: "eUTDSP: a design study of a new VLIW-based DSP architecture"; dated May 2003 (4 pages).
Chaji et al.: "Fast and Offset-Leakage Insensitive Current-Mode Line Driver for Active Matrix Displays and Sensors"; dated Feb. 2009 (8 pages).
Chaji et al.: "High Speed Low Power Adder Design With a New Logic Style: Pseudo Dynamic Logic (SDL)"; dated Oct. 2001 (4 pages).
Chaji et al.: "High-precision, fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report and Written Opinion for Application No. 08 86 5338 dated Nov. 2, 2011 (7 pages).
European Search Report for European Application No. EP 04 78 6661 dated Mar. 9, 2009.
European Search Report for European Application No. EP 05 75 9141 dated Oct. 30, 2009.
European Search Report for European Application No. EP 05 82 1114 dated Mar. 27, 2009 (2 pages).
European Search Report for European Application No. EP 07 71 9579 dated May 20, 2009.
European Search Report dated Mar. 26, 2012 in corresponding European Patent Application No. 10000421.7 (6 pages).
Extended European Search Report dated Apr. 27, 2011 issued during prosecution of European patent application No. 09733076.5 (13 pages).
Goh et al., "A New a-Si:H Thin Film Transistor Pixel Circul for Active-Matrix Organic Light-Emitting Diodes", IEEE Electron Device Letters, vol. 24, No. 9, Sep. 2003, 4 pages.
International Search Report for International Application No. PCT/CA02/00180 dated Jul. 31, 2002 (3 pages).
International Search Report for International Application No. PCT/CA2004/001741 dated Feb. 21, 2005.
International Search Report for International Application No. PCT/CA2005/001844 dated Mar. 28, 2006 (2 pages).
International Search Report for International Application No. PCT/CA2005/001007 dated Oct. 18, 2005.
International Search Report for International Application No. PCT/CA2007/000652 dated Jul. 25, 2007.
International Search Report for International Application No. PCT/CA2008/002307, dated Apr. 28. 2009 (3 pages).
International Search Report for International Application No. PCT/IB2011/055135, Canadian Patent Office, dated Apr. 16, 2012 (5 pages).
International Search Report dated Jul. 30, 2009 for International Application No. PCT/CA2009/000501 (4 pages).
Jafarabadiashtiani et al.: "A New Driving Method for a-Si AMOLED Displays Based on Voltage Feedback"; dated 2005 (4 pages).
Lee et al.: "Ambipolar Thin-Film Transistors Fabricated by PECVD Nanocrystalline Silicon"; dated 2006 (6 pages).
Ma e y et al: "Organic Light-Emitting Diode/Thin Film Transistor Integration for foldable Displays" Conference record of the 1997 International display research conference and international workshops on LCD technology and emissive technology. Toronto, Sep. 15-19, 1997 (6 pages).
Matsueda y et al.: "35.1: 2.5-in. AMOLED with Integrated 6-bit Gamma Compensated Digital Data Driver"; dated May 2004.
Nathan et al.: "Backplane Requirements for Active Matrix Organic Light Emitting Diode Displays"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)", dated 2006 (4 pages).
Nathan et al.: "Thin film imaging technology on glass and plastic" ICM 2000, Proceedings of the 12$^{th}$ International Conference on Microelectronics, (IEEE Cat. No. 00EX453), Tehran Iran; dated Oct. 31-Nov. 2, 2000, pp. 11-14, ISBM: 964-360-057-2, p. 13, col. 1, line 11-48; (4 pages).
Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Office Action issued in Chinese Patent Application 200910246264.4 dated Jul. 5, 2013; 8 pages.
Patent Abstracts of Japan, vol. 2000, No. 09, Oct. 13, 2000—JP 2000 172199 A, Jun. 3, 2000, abstract.
Patent Abstracts of Japan, vol. 2002, No. 03, Apr. 3, 2002 (Apr. 4, 2004 & JP 2001 318627 A (Semiconductor EnergyLab DO LTD), Nov. 16, 2001, abstract, paragraphs '01331-01801, paragraph '01691, paragraph '01701, paragraph '01721 and figure 10.

(56) References Cited

OTHER PUBLICATIONS

Philipp: "Charge transfer sensing" Sensor Review, vol. 19, No. 2, Dec. 31, 1999 (Dec. 31, 1999), 10 pages.
Rafati et al.: "Comparison of a 17 b multiplier in Dual-rail domino and in Dual-rail D L (D L) logic styles"; dated 2002 (4 pages).
Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Sanford, James L., et al., "4.2 TFT AMOLED Pixel Circuits and Driving Methods", SID 03 Digest, ISSN/0003, 2003, pp. 10-13.
Stewart M. et al., "Polysilicon TFT technology for active matrix OLED displays" IEEE transactions on electron devices, vol. 48, No. 5; Dated May 2001 (7 pages).
Tatsuya Sasaoka et al., 24.4L; Late-News Paper: A 13.0-inch AM-Oled Display with Top Emitting Structure and Adaptive Current Mode Programmed Pixel Circuit (TAC), SID 01 Digest, (2001), pp. 384-387.
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Written Opinion dated Jul. 30, 2009 for International Application No. PCT/CA2009/000501 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Zhiguo Meng et al; "24.3: Active-Matrix Organic Light-Emitting Diode Display implemented Using Metal-Induced Unilaterally Crystallized Polycrystalline Silicon Thin-Film Transistors", SID 01Digest, (2001), pp. 380-383.
International Search Report for Application No. PCT/IB2014/059409, Canadian Intellectual Property Office, dated Jun. 12, 2014 (4 pages).
Written Opinion for Application No. PCT/IB2014/059409, Canadian Intellectual Property Office, dated Jun. 12, 2014 (5 pages).
Extended European Search Report for Application No. EP 14181848.4, dated Mar. 5, 2015, (9 pages).

\* cited by examiner ns DYNAMIC ADJUSTMENT OF TOUCH
RESOLUTIONS ON AN AMOLED DISPLAY

CROSS-REFERENCE TO RELATED APPLICATIONS

This application is a U.S. National Stage of International Application No. PCT/IB2014/059409, filed Mar. 3, 2014, which claims the benefit of U.S. Provisional Application No. 61/792,358, filed Mar. 15, 2013, each of which is hereby incorporated herein by reference in their respective entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE PRESENT DISCLOSURE

The present disclosure generally relates to touch-sensitive displays, and more particularly, to methods of dynamically adjusting a touch resolution of an active-matrix organic light-emitting diode display where the light emitting device is used for touch detection.

BACKGROUND

Touch resolutions on AMOLED displays are generally fixed, and the number of touch zones is defined by how the touch monitoring circuit that monitors the touch substrate is subdivided in a predetermined and fixed manner.

BRIEF SUMMARY

According to an aspect of the present disclosure, a method is disclosed of dynamically adjusting a touch resolution of a video display having a plurality of pixel circuits each including a light emitting device driven by a driving transistor according to a programming current or voltage representing a desired brightness produced by the light emitting device. The method comprises: defining, by a controller, a first touch resolution of the video display to create a first plurality of capacitive touch zones relative to a transparent substrate of the video display as images are being displayed on the video display; detecting a first touch on the transparent substrate in one of the first touch zones by measuring a voltage across an anode and a cathode of each of a first set of light emitting devices of the video display in the first touch zone; dynamically changing, by the controller, the first touch resolution to a second touch resolution different from the first touch resolution to create a second plurality of capacitive touch zones relative to the video display as further images are being displayed on the video display; and detecting a second touch in one of the second touch zones by measuring a voltage across an anode and a cathode of each of a second set of light emitting devices of the video display in the second touch zone.

The measuring corresponding changes in the voltage across each of the first set of light emitting devices can include: activating each of a first set of read transistors connected to corresponding ones of the first set of light emitting devices thereby connecting each of the first set of read transistors to a readout circuit; comparing the measured voltage from each of the first set of activated read transistors with a criterion indicative of a touch; and responsive to the comparing indicating that the criterion is satisfied, the controller indicating a coordinate of the first touch relative to the video display in the one of the first touch zones.

A gate of each of the first set of read transistors can be connected to a corresponding readout select line. A first terminal of each of the first set of read transistors can be connected to a corresponding monitor line that is connected to the readout circuit. The activating can include activating each of the gates of the first set of read transistors simultaneously with activating the corresponding monitor line connected to readout circuit.

The method can further comprise: simultaneously with the detecting, determining from the measured voltage an aging characteristic of the driving transistor or of the light emitting device of a selected pixel circuit in the one of the first touch zones; adjusting the programming current or voltage for the selected pixel circuit to compensate for the determined aging characteristic; and driving the light emitting device in the selected pixel circuit according to the adjusted programming current or voltage.

The detecting can be carried out simultaneously with programming each of the pixel circuits in the one of the first touch zones with a desired brightness. The first touch resolution can correspond to a surface area of a tip of an average human finger, and the second touch resolution can correspond to a surface area of a point of a capacitive stylus, or vice versa.

The maximum number of touch zones can correspond exactly to the number of pixels in the video display such that each of the pixels in the video display corresponds to a discrete touch point.

A size of the first touch resolution can be N×M such that N is an integer multiple of the total number of rows of pixel circuits forming the video display and M is an integer multiple of the total number of columns of pixel circuits forming the video display. A size of the second touch resolution can be P×Q such that P is an integer multiple of the total number of rows of pixel circuits forming the video display and Q is an integer multiple of the total number of columns of pixel circuits forming the video display. N×M is distinct from P×Q.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

Figure 1:
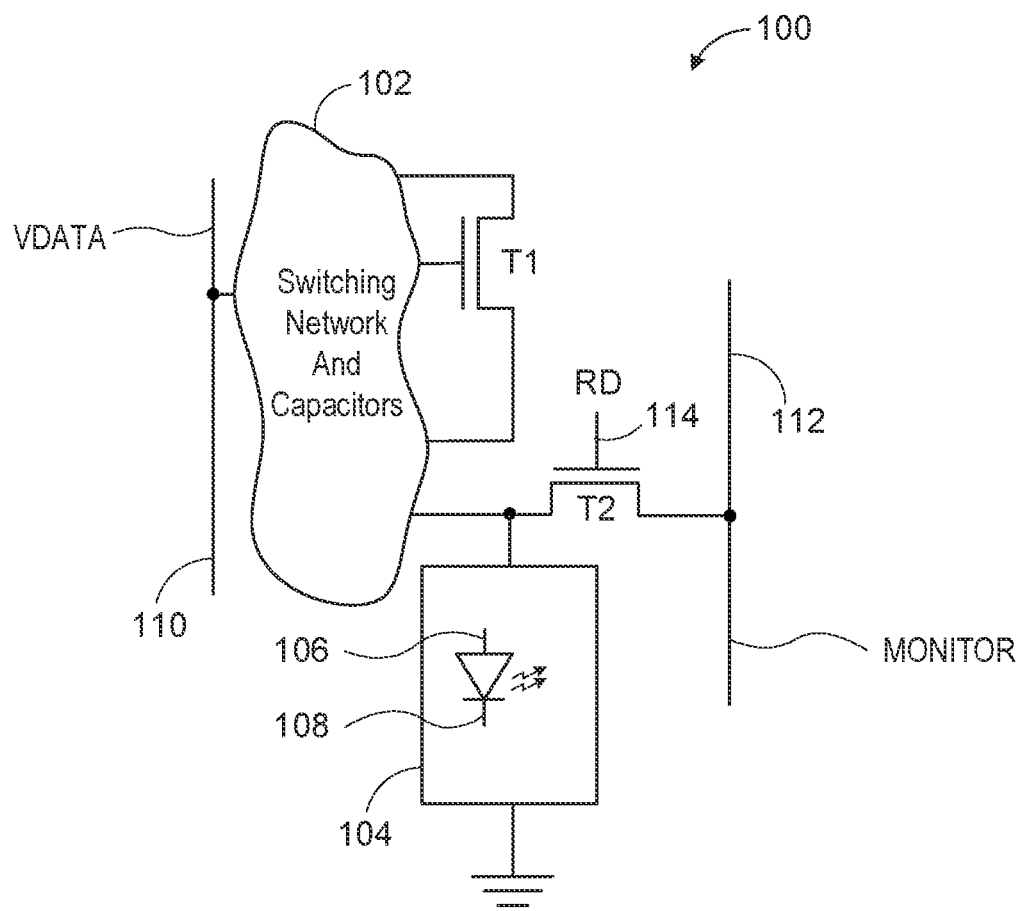
FIG. 1 is functional block diagram of an example pixel circuit showing a light emitting device that is used for touch detection.

While the present disclosure is susceptible to various modifications and alternative forms, specific embodiments and implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the inventions as defined by the appended claims.

DETAILED DESCRIPTION

Figure 2:
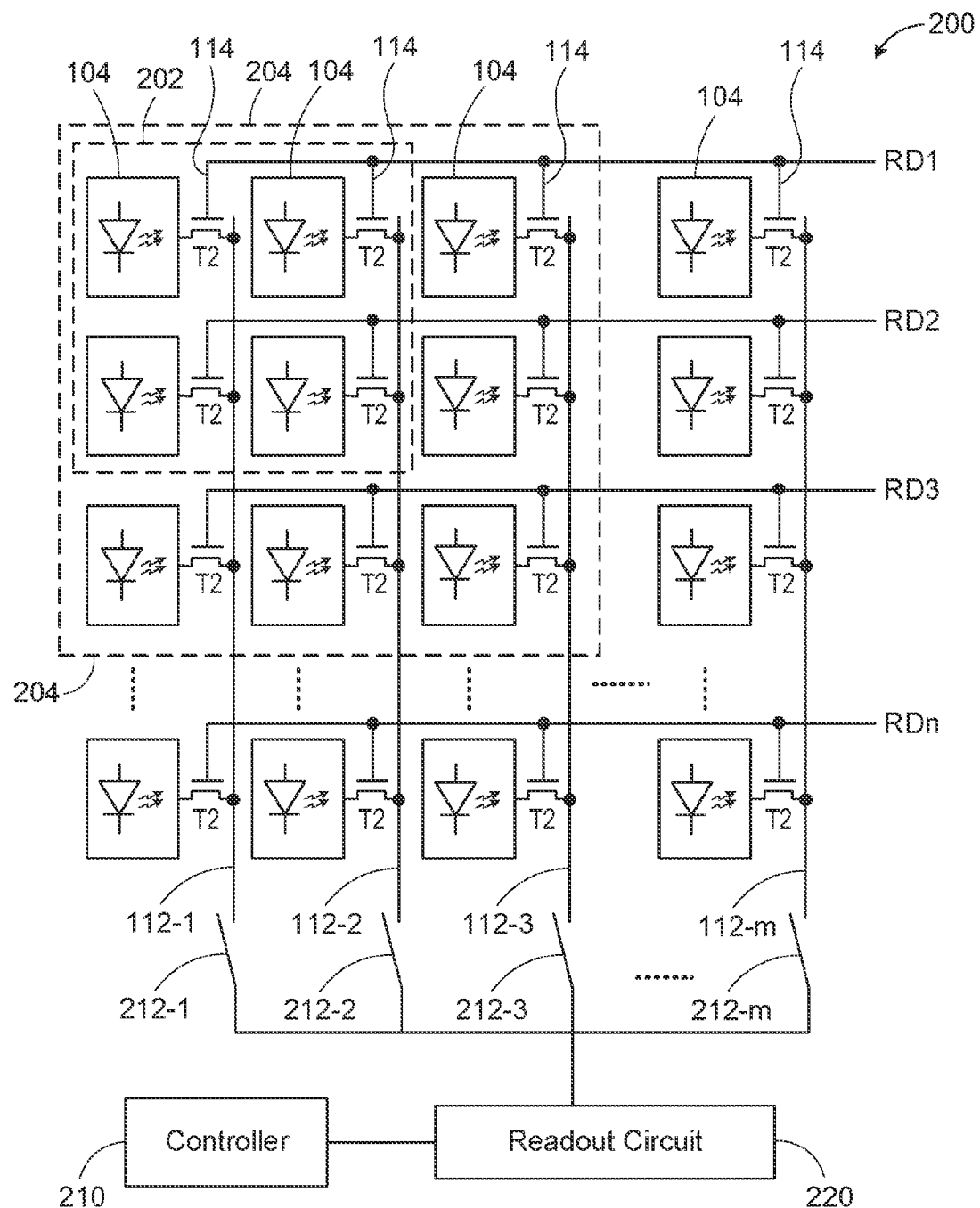
FIG. 2 is a functional block diagram of part of an active matrix display having monitor lines on the columns of the display and readout select lines on the rows of the display for dynamically defining differently sized touch zones relative to the display.

FIG. 2 is an electronic video display system or panel 200 having an active matrix area or pixel array in which an array of pixel circuits 100 (shown in FIG. 1) are arranged in a row and column configuration. For ease of illustration, only some rows and columns are shown. Peripheral circuitry external to an active matrix area on the display includes a conventional gate or address driver circuit (not shown), a source or data driver circuit (not shown), a controller 210, and a readout circuit 220 connected to the controller 210 (these are illustrated as functional modules, so the readout circuit 220 can be part of the controller 210). The controller 210 conventionally controls the gate and source drivers (not shown). The gate driver, under control of the controller 210, operates on address or select lines SEL, one for each row of pixels 104 in the display 200. The source driver circuit, under control of the controller 210, operates on voltage data lines VDATA 110, one for each column of pixels 104 in the display 200. The voltage data lines VDATA 110 carry voltage or current programming information to each pixel circuit 100 indicative of a luminance (or brightness as subjectively perceived by an observer) of each light emitting device 104. A conventional storage element, such as a capacitor, in each pixel circuit 100 (see FIG. 1) stores the programming information until an emission or driving cycle turns on the light emitting device 104, such as an organic light emitting device (OLED). During the driving cycle, the programming information preserved in the storage element in each pixel circuit is transferred by a drive transistor T1 to illuminate each light emitting device 104 at the programmed luminance.

As is known, each pixel circuit (FIG. 1) in the display 200 needs to be programmed with information indicating the luminance of the light emitting device 104. This information can be supplied by the controller 210 to each light emitting device 104 in the form of a stored voltage or a current. A frame defines the time period that includes a programming cycle or phase during which each and every pixel circuit (FIG. 1) in the display system 200 is programmed with a programming voltage (or current) indicative of a luminance and a driving or emission cycle or phase during which each light emitting device 104 in each pixel circuit 100 is turned on to emit light at a luminance commensurate with or indicative of the programming voltage stored in a storage element or a programming current. A frame is thus one of many still images that compose a complete moving picture displayed on the display system 200. There are different schemes for programming and driving the pixels, including row-by-row and frame-by-frame. In row-by-row programming, a row of pixels is programmed and then driven before the next row of pixels is programmed and driven. In frame-by-frame programming, all rows of pixels in the display system 100 are programmed first, and all of the pixels are driven row-by-row. Either scheme can employ a brief vertical blanking time at the beginning or end of each frame during which the pixels are neither programmed nor driven.

Turning now to the example pixel circuit 100 shown in FIG. 1, each pixel circuit 100 includes conventional a switching network and one or more capacitors (102). The switching network conventionally includes one or more switching transistors for conveying the programming information from the VDATA line 110 to the one or more storage devices and storing that information in the storage devices until the driving or emission cycle. The details of the switching network are not pertinent here. Each pixel circuit 100 includes a driving transistor T1, which turns on to transfer the programming information stored in the one more storage devices in the switching network 102 in the form of a drive current to the light emitting device 104, which in this example is an organic light-emitting diode (OLED). The OLED has an anode 106 and a cathode 108, which form a capacitor whose varying voltage can be used to detect a touch. When a human finger or a stylus grasped by a human hand is brought sufficiently near the surface of the anode 106, a voltage across the OLED changes, and this change in voltage can be used by the controller 210 to detect a touch. To read the OLED voltage across the anode and cathode 106, 108, each pixel circuit 100 includes a read transistor T2 having a gate terminal connected to a readout select line 114 (RD), a drain terminal connected to a monitor line 112, and a source terminal connected to the anode 106 of the OLED 104. When the read transistor T2 is activated, the voltage across the OLED 104 is transferred to the monitor line 112, which is read by the readout circuit 220. Because each pixel circuit 100 can detect a touch, the touch resolution for the entire display 200 is equal to the pixel resolution.

FIG. 2 shows two touch zones 202, 204. For ease of illustration, the first touch zone 202 is shown as having an array size of N×M pixels (2×2), whereas the second touch zone 204 is shown as having an array size of P×Q pixels (3×3). Of course, the present disclosure contemplates any touch resolutions of any size or shape (array, circular, irregular), where N, M, P, and Q can be any positive integers but no greater than the overall pixel resolution ($N_R \times N_C$ pixels 100) of the display 200. Moreover, each of the touch zones can be different on the display 200. For example, in one area of the display 200, the touch zones can be relatively small, such as to detect the tip of a capacitive stylus grasped by a human finger, but another area of the same display 200 can have relatively large touch zones, such as sufficiently sized to detect the tip of an average-sized human finger. Thus, the various touch zones can be uniform or non-uniform relative to the entire surface of the display 200. In the illustrated example, the touch zones are uniform, but this is merely for ease of illustration. Because each OLED 104 is capable of detecting a discrete touch, the smallest achievable touch resolution is 1×1 pixel. Some aspects of the present disclosure are directed to dynamically changing the touch resolution by exploiting the fact that each OLED 104 itself can be used to detect a touch, and by selectively reading the voltage across different groupings of OLEDs in the display 200, different touch resolutions are achievable on-the-fly in real time as the display 200 is displaying images.

As disclosed herein, the controller 210 can dynamically adjust the touch resolution of the display 200 as the display 200 is displaying images, by selectively activating combinations of the monitor lines 112 and the readout select lines 114 to dynamically define different touch resolutions as images are being displayed on the display 200. During the programming cycles, for example, the readout circuit 220 or controller 200 can selectively activate selected ones of the readout select lines 114 (rows) while selectively activating selected ones of the monitor lines 112 (columns) to define a touch electrode or a touch zone. In FIG. 2, the first touch zone 202 is selected by successively activating the RD1 and RD2 lines and simultaneously activating monitor switches 212-1 and 212-2, thereby allowing the voltage from the OLEDs 104 in the four pixel circuits 100 that comprise the first touch zone 202 to be read by the readout circuit 220 via the respective monitor lines 112-1 and 112-2. For example, the first two pixel circuits 100 in the first row can be selected by activating the RD1 line and simultaneously activating the monitor switches 212-1 and 212-2, and reading the OLED voltage that is presented at the drain of T2. Then, while keeping the monitor switches 212-1 and 212-2 activated, the RD1 line is deactivated while the RD2 line is activated, thereby reading the OLED voltages for the two pixels in the second row. This readout can occur, for example, simultaneously while programming each of the pixel circuits 100 with programming information on the respective VDATA lines 110 (omitted from FIG. 2 for clarity and ease of discussion).

In the next frame, for example, before the next image is displayed on the display 200, the controller 200 can dynamically change the touch resolution from 2×2 as defined by the touch zone 202, to a larger touch resolution of 3×3 as defined by the second touch zone 204, which comprises an array of 3×3 pixel circuits 100 in the illustrated example. Each of the readout select lines RD1, RD2, RD3 are successively activated while the monitor switches 212-1 to 212-3 remain activated, and the corresponding OLED voltages from each of the rows are read by the readout circuit 220 to determine whether a touch is detected in the second touch zone 204. The programming information for the next image to be displayed can be simultaneously imparted to the storage device(s) in the switching network 102 via the VDATA lines 110.

Figure 3:
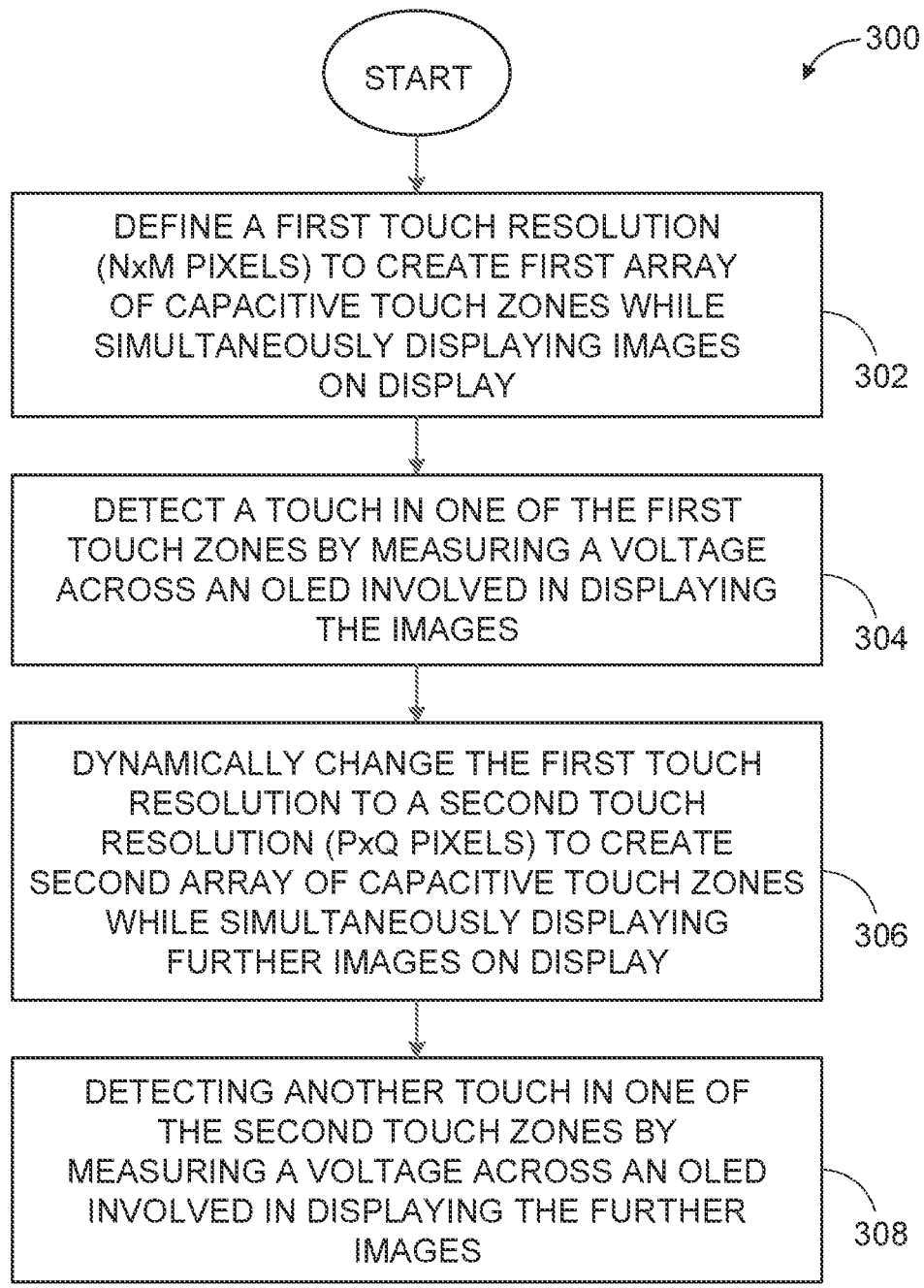
FIG. 3 is a flowchart diagram of an exemplary algorithm for dynamically adjusting the touch resolution of a display while displaying images on the display.

FIG. 3 is a flow chart diagram of an example method or algorithm 300 for carrying out an aspect of the present disclosure. The algorithm 300 is directed to dynamically adjustment of a touch resolution of a video display 200 having a pixel circuits 100 such as shown in FIG. 1. Each pixel circuit 100 includes a light emitting device 104 driven by a driving transistor T1 according to a programming current or voltage representing a desired brightness produced by the light emitting device 104. The algorithm 300 defines, by a controller 200, a first touch resolution of the video display 200 to create first capacitive touch zones 202 relative to a transparent substrate of the display 200 as images are being displayed on the display 200 (302). The controller 200 detects a first touch (e.g., by a capacitive stylus grasped by a human hand) relative to the display 200 in one of the first touch zones by measuring a voltage across an anode 106 and a cathode 108 of each of a first set of light emitting devices 104 of the display 200 in the first touch zone 202 (304). The controller dynamically changes the first touch resolution to a second touch resolution different from the first touch resolution to create second capacitive touch zones 204 relative to the display 200 as further images are being displayed on the display 200 (306). The controller 200 detects a second touch (e.g., by a tip of an average-size human finger) in one of the second touch zones 204 by measuring a voltage across an anode 106 and a cathode 108 of each of a second set of light emitting devices 104 of the display 200 in the second touch zone 204 (308).

Changes in the voltage across the light emitting devices 104 can be measured as follows. Each of a first set of read transistors T2 connected to corresponding ones of the first set of light emitting devices 104 is activated, thereby connecting each of the first set of read transistors T2 to a readout circuit 220. The algorithm 300 compares the measured voltage from each of the first set of activated read transistors T2 with a criterion indicative of a touch. The criterion can include a threshold value such that if the voltage changes by more than the threshold value, a touch is detected. If the criterion is satisfied such that a touch is detected, the controller 200 indicates a coordinate of the first touch relative to the display 200 in the one of the first touch zones 202.

A gate of each of the first set of read transistors T2 is connected to a corresponding readout select line RD. A first terminal (e.g., a drain) of each of the first set of read transistors T2 is connected to a corresponding monitor line 112 that is connected to the readout circuit 220. Each of the gates of the first set of read transistors T2 in one of the rows, e.g., the row defined by RD1, are activated simultaneously with activating the corresponding monitor line 112 connected to readout circuit 220 by activating respective ones of the monitor switches 212. As touches are being detected, the readout circuit 220 can also determine from the measured voltage an aging or non-uniformity (caused by process non-uniformities in the fabrication of the display 200) characteristic of the driving transistor T1 or of the light emitting device 104 of a selected pixel circuit 100 in the one of the first touch zones 202. The algorithm 300 can adjust the programming current or voltage for the selected pixel circuit 100 to compensate for the determined aging or non-uniformity characteristic or both, and drive the light emitting device 104 in the selected pixel circuit 100 according to the adjusted programming current or voltage to compensate for the aging or non-uniformity characteristic or both.

The touch detection can be carried out simultaneously with programming each of the pixel circuits 100 in the one of the first touch zones 202 with a desired brightness. The first touch resolution can, for example, correspond to a surface area of a tip of an average human finger, and the second touch resolution can, for example, correspond to a surface area of a point of a capacitive stylus, or vice versa. As mentioned above, different regions on the display 200 can have different touch resolutions simultaneously, such that part of the display 200 is used for detecting stylus inputs, for example, while another part of the same display 200 is used for detecting inputs from a human finger (which requires a bigger touch resolution).

A maximum number of touch zones definable relative to the display 200 corresponds exactly to the number of pixels 100 in the display 200 such that each of the pixels 100 in the display 200 corresponds to a discrete touch point. In other words, the smallest possible touch resolution has a size of one pixel circuit 100. A size of the first touch resolution is N×M such that N is an integer multiple of the total number of rows of pixel circuits 100 forming the display 200, and M is an integer multiple of the total number of columns of pixel circuits 100 forming the display 200. N can be identical to or distinct from M. A size of the second touch resolution is P×Q such that P is an integer multiple of the total number of rows of pixel circuits 100 forming the display 200, and Q is an integer multiple of the total number of columns of pixel circuits 100 forming the display 200. P can be identical to or distinct from Q. N×M is distinct from P×Q. As mentioned above, the form factor of the touch zones is not limited to an array, but can be any regular or irregular shape.

Any of the circuits disclosed herein can be fabricated according to many different fabrication technologies, including for example, poly-silicon, amorphous silicon, organic semiconductor, metal oxide, and conventional CMOS. Any of the circuits disclosed herein can be modified by their complementary circuit architecture counterpart (e.g., n-type circuits can be converted to p-type circuits and vice versa).

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the scope of the invention as defined in the appended claims.

What is claimed is:

1. A method of dynamically adjusting a touch resolution of a video display having a plurality of pixel circuits each including a light emitting device driven by a driving transistor according to a programming current or voltage representing a desired brightness produced by the light emitting device, comprising:
    defining, by a controller, a first touch resolution of the video display to create a first plurality of capacitive touch zones relative to a transparent substrate of the video display as images are being displayed on the video display;
    detecting a first touch on the transparent substrate in a first touch zone of the first plurality of capacitive touch zones by measuring a voltage across an anode and a cathode of each of a first set of light emitting devices of the video display in the first touch zone;
    dynamically changing, by the controller, the first touch resolution to a second touch resolution different from the first touch resolution to create a second plurality of capacitive touch zones relative to the video display as further images are being displayed on the video display; and
    detecting a second touch in a second touch zone of the second plurality of capacitive touch zones by measuring a voltage across an anode and a cathode of each of a second set of light emitting devices of the video display in the second touch zone, wherein each light emitting of the first set of light emitting devices and each light emitting device of the second set of light emitting devices is self-emitting.

2. The method of claim 1, wherein the measuring corresponding changes in the voltage across each of the first set of light emitting devices includes:
    activating each of a first set of read transistors connected to corresponding ones of the first set of light emitting devices thereby connecting each of the first set of read transistors to a readout circuit;
    comparing the measured voltage from each of the first set of activated read transistors with a criterion indicative of a touch; and
    responsive to the comparing indicating that the criterion is satisfied, the controller indicating a coordinate of the first touch relative to the video display in the first touch zone.

3. The method of claim 2, wherein a gate of each of the first set of read transistors is connected to a corresponding readout select line, and wherein a first terminal of each of the first set of read transistors is connected to a corresponding monitor line that is connected to the readout circuit, wherein the activating includes activating each of the gates of the first set of read transistors simultaneously with activating the corresponding monitor line connected to readout circuit.

4. The method of claim 3, further comprising:
    simultaneously with the detecting, determining from the measured voltage an aging characteristic of the driving transistor or of the light emitting device of a selected pixel circuit in the first touch zone;
    adjusting the programming current or voltage for the selected pixel circuit to compensate for the determined aging characteristic; and
    driving the light emitting device in the selected pixel circuit according to the adjusted programming current or voltage.

5. The method of claim 1, wherein the detecting is carried out simultaneously with programming each of the pixel circuits in the first touch zone with a desired brightness.

6. The method of claim 1, wherein the first touch resolution corresponds to a surface area of a tip of an average human finger, and wherein the second touch resolution corresponds to a surface area of a point of a capacitive stylus, or vice versa.

7. The method of claim 1, wherein a maximum number of touch zones definable relative to the video display corresponds exactly to the number of pixels in the video display such that each of the pixels in the video display corresponds to a discrete touch point.

8. The method of claim 1, wherein a size of the first touch resolution is N×M such that N is an integer not greater than the total number of rows of pixel circuits forming the video display and M is an integer not greater than the total number of columns of pixel circuits forming the video display, and wherein a size of the second touch resolution is P×Q such that P is an integer not greater than the total number of rows of pixel circuits forming the video display and Q is an integer not greater than the total number of columns of pixel circuits forming the video display, where N×M is distinct from P×Q.

9. The method of claim 1, wherein the video display is an active matrix organic light-emitting organic device (AMOLED) display, and each of the light emitting devices is an organic light emitting device (OLED).

* * * * *